(12) United States Patent
Chen et al.

(10) Patent No.: US 7,169,460 B1
(45) Date of Patent: Jan. 30, 2007

(54) THERMOPLASTIC PLANKS AND METHODS FOR MAKING THE SAME

(75) Inventors: Hao A. Chen, Chadds Ford, PA (US); Richard Judd, Newark, DE (US)

(73) Assignee: Mannington Mills, Inc., Salem, NJ (US)

( * ) Notice: Subject to any disclaimer, the term of this patent is extended or adjusted under 35 U.S.C. 154(b) by 118 days.

(21) Appl. No.: 09/630,121

(22) Filed: Aug. 1, 2000

Related U.S. Application Data

(63) Continuation-in-part of application No. 09/460,928, filed on Dec. 14, 1999, now Pat. No. 6,617,009.

(51) Int. Cl.
*B32B 27/30* (2006.01)
*B32B 27/16* (2006.01)
*E04F 15/02* (2006.01)

(52) U.S. Cl. .................. 428/195.1; 428/166; 428/201; 428/203; 428/204; 428/46; 428/409; 428/514; 52/586.1; 52/309.1; 427/261; 427/267

(58) Field of Classification Search ................. 428/195, 428/195.1, 166, 201, 203, 204, 46, 409, 514; 427/261, 267; 52/586.1, 309.1
See application file for complete search history.

(56) References Cited

U.S. PATENT DOCUMENTS

| | | |
|---|---|---|
| 1,018,987 A | 2/1912 | Philpot et al. |
| 1,361,501 A | 12/1920 | Schepmoes |
| 1,946,690 A | 2/1934 | Haines .......................... 72/19 |
| 2,142,305 A | 1/1939 | Davis .............................. 72/68 |
| 2,204,675 A | 6/1940 | Grunert ............................ 20/8 |
| 2,740,167 A | 4/1956 | Rowley ............................ 20/8 |
| 3,310,919 A | 3/1967 | Bue et al. ...................... 52/127 |
| 3,397,496 A | 8/1968 | Sohns .......................... 52/286 |
| 3,619,963 A | 11/1971 | Omholt ........................ 52/483 |
| 3,657,852 A | 4/1972 | Worthington et al. ......... 52/591 |
| 3,694,983 A | 10/1972 | Couquet ....................... 52/384 |
| 3,760,547 A | 9/1973 | Brenneman ................... 52/586 |
| 3,946,529 A | 3/1976 | Chevaux ....................... 52/390 |
| 4,023,596 A | 5/1977 | Tate ........................... 138/111 |

(Continued)

FOREIGN PATENT DOCUMENTS

DE 3150352 A1 10/1982

(Continued)

*Primary Examiner*—William P. Watkins, III
(74) *Attorney, Agent, or Firm*—Kilyk & Bowersox, P.L.L.C.

(57) ABSTRACT

A thermoplastic laminate plank is described wherein the thermoplastic laminate plank comprises a core, a print layer, and optionally an overlay. The core comprises at least one thermoplastic material and has a top surface and bottom surface wherein a print layer is affixed to the top surface of the core and an overlay layer is affixed to the top surface of the print layer. Optionally, an underlay layer can be located and affixed between the bottom surface of the print layer and the top surface of the core. In addition, a method of making the thermoplastic laminate plank is further described which involves extruding at least one thermoplastic material into the shape of the core and affixing a laminate on the core, wherein the laminate comprises an overlay affixed to the top surface of the print layer and optionally an underlay layer affixed to the bottom surface of the print layer.

35 Claims, 4 Drawing Sheets

U.S. PATENT DOCUMENTS

| | | | |
|---|---|---|---|
| 4,169,688 A | 10/1979 | Toshio | 404/40 |
| 4,226,064 A | 10/1980 | Kraayenhof | 52/180 |
| 4,426,820 A | 1/1984 | Terbrack et al. | 52/594 |
| 4,526,418 A | 7/1985 | Martin | 296/182 |
| 4,610,900 A * | 9/1986 | Nishibori | 428/15 |
| 4,724,187 A | 2/1988 | Ungar et al. | 428/408 |
| 4,759,164 A | 7/1988 | Abendroth et al. | 52/403 |
| 4,769,963 A | 9/1988 | Meyerson | 52/309.9 |
| 4,788,088 A | 11/1988 | Kohl | 428/34.5 |
| 4,849,768 A * | 7/1989 | Graham | 347/14 |
| 4,947,595 A | 8/1990 | Douds et al. | 52/177 |
| 4,976,221 A | 12/1990 | Yetter | 119/20 |
| 5,052,158 A | 10/1991 | D'Luzansky | 52/177 |
| 5,295,341 A | 3/1994 | Kajiwara | 52/586.2 |
| 5,322,335 A | 6/1994 | Niemi | 296/97.23 |
| 5,349,796 A | 9/1994 | Meyerson | 52/309.11 |
| 5,367,844 A | 11/1994 | Diedrich | 52/239 |
| 5,480,602 A | 1/1996 | Nagaich | 264/122 |
| 5,503,788 A | 4/1996 | Lazareck et al. | 264/115 |
| 5,553,427 A * | 9/1996 | Andres | 114/266 |
| 5,642,592 A | 7/1997 | Andres | 52/177 |
| 5,647,184 A | 7/1997 | Davis | 52/592.1 |
| 5,660,016 A | 8/1997 | Erwin et al. | 52/483.1 |
| 5,662,977 A * | 9/1997 | Spain et al. | 428/141 |
| 5,694,730 A | 12/1997 | Del Rincon et al. | 52/586.1 |
| 5,713,165 A | 2/1998 | Erwin | 52/181 |
| 5,758,466 A | 6/1998 | Tucker | 52/586.2 |
| 5,777,014 A * | 7/1998 | Hopper et al. | 524/308 |
| 5,797,237 A | 8/1998 | Finkell, Jr. | 52/589.1 |
| 5,833,386 A | 11/1998 | Rosan et al. | 404/36 |
| 5,869,138 A * | 2/1999 | Nishibori | 427/274 |
| D406,360 S | 3/1999 | Finkell, Jr. | D25/138 |
| 6,006,486 A | 12/1999 | Moriau et al. | 52/589.1 |
| 6,023,907 A | 2/2000 | Pervan | 52/748.1 |
| 6,027,599 A * | 2/2000 | Wang | 156/258 |
| 6,139,945 A | 10/2000 | Krejchi et al. | 428/317.9 |
| 6,324,809 B1 * | 12/2001 | Nelson | 52/309.14 |

FOREIGN PATENT DOCUMENTS

| | | |
|---|---|---|
| DE | 3135716 A1 | 6/1983 |
| DE | 33 43 601 A1 | 12/1983 |
| DE | 42 42 530 A1 | 12/1992 |
| FR | 2 557 905 | 7/1985 |
| GB | 1 430 423 | 3/1976 |
| GB | 02095814 A | 10/1982 |
| GB | 02147856 A | 5/1985 |
| JP | 3-169967 | 7/1982 |
| JP | 57-119056 | 7/1982 |
| JP | 405169534 A | 7/1993 |
| WO | WO 94/26999 | 11/1994 |
| WO | WO 95/11333 | 4/1995 |
| WO | WO 96/07801 A1 | 3/1996 |
| WO | WO 97/21011 | 6/1997 |

* cited by examiner

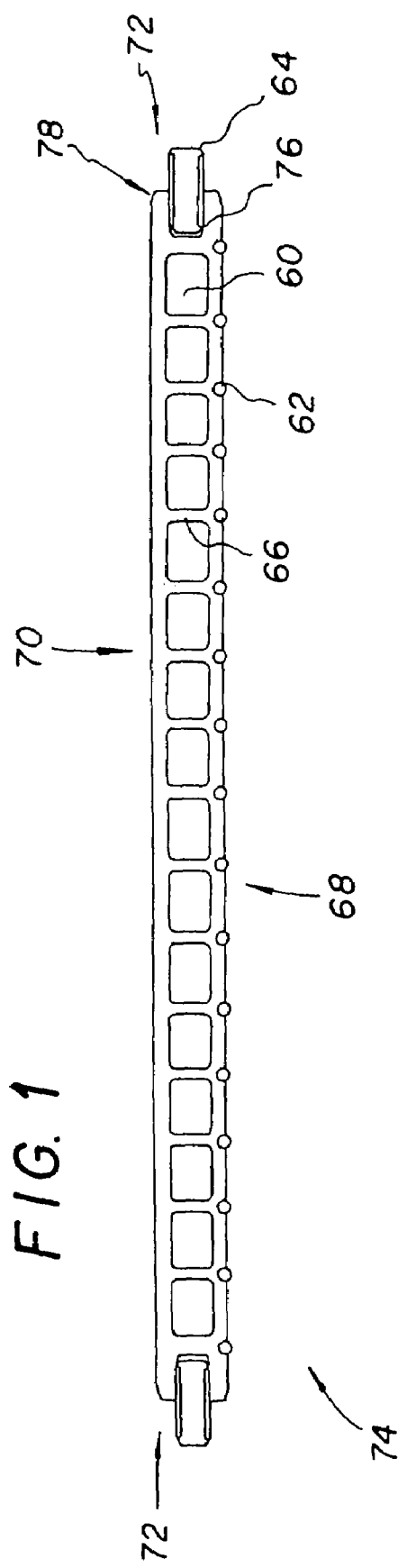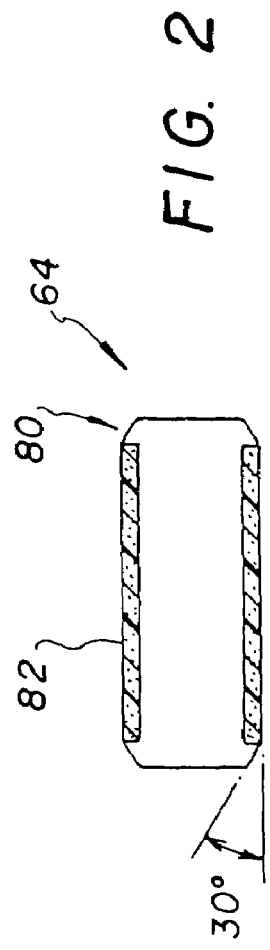
FIG. 1
FIG. 2

THERMOPLASTIC PLANKS AND METHODS FOR MAKING THE SAME

This application is a continuation-in-part of prior U.S. application Ser. No. 09/460,928 filed Dec. 14, 1999 now U.S. Pat. No. 6,617,009 and is incorporated in its entirety by reference herein.

BACKGROUND OF THE INVENTION

Commercially available laminate flooring (using high or medium density fiberboard or particle board as the core layer) has gained overwhelming success in the flooring market. The growth rate of the laminate flooring has remained in the double digits since the product was introduced in the United States market. The success of this product is credited to certain properties such as stain resistance, wear resistance, fire resistance, good cleanability, and the ability to use just about any type of printed design. In addition, the overall emission of organic compound vapor is low and the laminate flooring is considered color stable and environmentally friendly over other competing flooring products.

The biggest concern with commercially available laminate flooring is the moisture resistance of the finished product and the sensitivity of the raw materials (high or medium density fiberboard, paper, and particle board) to moisture during the manufacturing process. In some instances, the moisture can lead to some serious quality control issues and application restraints. For instance, and just to name a few, the higher moisture content in the product, such as in the particle board or fiberboard, can cause blistering and adhesion failure of the melamine surface to the core. Also, higher moisture contents can lead to dimensional instability of the finished product, which then results in the cupping or doming of the product, which is extremely undesirable, especially when installers are laying down the flooring. Also, excessive moisture contents can create edge peaking due to the swelling of the product and such edge peaking can result in edge chip-off or premature wear-out or can soil more quickly. The susceptibility to moisture content also leads to some installers not wishing to place such laminate flooring in areas which are subject to having water on the surface of the floor, such as in the kitchen and bathroom areas.

The suppliers of such laminate flooring have appreciated the problems associated with their products and have attempted to overcome these problems by developing laminate flooring having better moisture resistance by using melamine, phenolic, or isocyanate binders to partially replace urea resins present in the laminate flooring. While this improvement has made the product more moisture resistant, the current commercially available laminate floorings are still prone to moisture damage. For instance, the thickness swelling of laminate flooring can increase by 10% and water absorbency can exceed more than 15% according to the 24 hours water absorption test. Another attempted solution at the moisture resistance weaknesses of current laminate flooring has led some manufactures to apply a water-repellant material on the upper edges of the tongue and groove areas which further serve to resist any moisture penetration through joints. Still another attempted solution involves applying silicone caulk to seal the edges and voids of the laminate perimeter where the laminate flooring meets the wall. However, if very stringent installation instructions are not followed, the laminate flooring will still be subjected to moisture damage.

Accordingly, there is a need to develop a laminate flooring system which overcomes the above weaknesses and disadvantages of current commercially available laminate flooring.

SUMMARY OF THE INVENTION

A feature of the present invention is to provide a laminate plank which can be used in a surface covering system which provides improved moisture resistance and is not susceptible to damage caused by moisture.

Another feature of the present invention is to provide a laminate plank and surface covering system which is economically feasible and permits easy installation and flexibility.

A further feature of the present invention is to provide a flooring system that improves foot comfort and other ergonomic benefits.

An additional feature of the present invention is to provide a surface covering system having improved sound deadening and other reduced sound transmission benefits.

Still another feature of the present invention is to provide a surface covering system which has significant improvements with respect to ease of installation and includes a fool-proof installation design and technique.

Another feature of the present invention is to provide a surface covering system which avoids the use of a wet adhesive application method.

Another feature of the present invention is to provide a flooring system that has great flexibility so as to make various shapes, sizes, and bevel edges.

Another feature of the present invention is to provide a flooring system that can alleviate the requirement of installing the plank in a given orientation.

Also, a feature of the present invention is provide a surface covering system which has the ability to tolerate some imperfections in the sub-floor or substrate and thus avoid telegraphing the imperfections on the surface covering itself.

A further feature of the present invention is to provide a surface covering system which has improved damaged resistance properties, such as improved impact strength and the like.

Additional features and advantages of the present invention will be set forth in the description which follows, and in part will be apparent from the description, or may be learned by practice of the present invention. The features and other advantages of the present invention will be realized and attained by means of the elements and combinations particularly pointed out in the written description and appended claims.

To achieve these and other advantages and in accordance with the purpose of the present invention, as embodied and broadly described herein, the present invention relates to a thermoplastic laminate plank, wherein the laminate plank has a core comprising at least one thermoplastic material, wherein the core has a top surface and a bottom surface. Optionally affixed to the top surface of the core can be a print layer, wherein the print layer has a top surface and a bottom surface. Also, an overlay layer can be affixed directly to the top surface of the core, or, if a print layer is provided, affixed to the top surface of the print layer. The plank can optionally contain an underlay layer located and affixed between the bottom surface of the print layer and the top surface of the core.

The present invention further relates to a method of making a thermoplastic laminate plank and involves the step of processing (e.g., extruding) at least one thermoplastic material into the shape of a core and optionally affixing a laminate on the core, wherein the laminate can comprise a print layer, an overlay layer affixed to the top surface of the print layer, and optionally an underlay layer affixed to the bottom surface of the print layer.

Also, the present invention relates to a method of making a thermoplastic plank by printing a design directly on the top surface of the plank using any number of printing techniques, such as gravure printing, transfer printing, digital printing, Flexo printing, screen printing, and the like. The method can also include applying a protective coating on top of the printed design, such as a polyurethane type coating with or without wear resistant particles in the coating. The top surface of the plank can also be treated or formed to have a textured finish such as a roughed, grooved, cross-hatched, striated, pitted, cracked, or wood grain or streak texture. In addition, decorative foils or printed overlays can be affixed to the top surface of the plank and then covered by a protective coating(s).

A further embodiment of the present invention relates to making a thermoplastic plank for flooring by co-extrusion techniques, which involves extruding at least one thermoplastic material into the shape of the core and also extruding a layer containing at least one thermoplastic material with one or more pigmented compounds on top of the extruded core, wherein the layer simulates a design, such as wood grain or marble.

The present invention also relates to thermoplastic planks having the above-described characteristics.

It is to be understood that both the forgoing general description and the following detailed description are exemplary and explanatory only and are intended to provide further explanation of the present invention, as claimed.

The accompanying drawings, which are incorporated in and constitute a part of this application, illustrate several embodiments of the present invention and together with the description serve to explain the principles of the present invention.

BRIEF DESCRIPTION OF THE DRAWINGS

FIG. 1 is a schematic diagram showing an end view of one embodiment of a thermoplastic laminate plank of the present invention.

FIG. 2 is a schematic diagram showing a side view of a spline design which can be used to connect together the planks of the present invention.

DETAILED DESCRIPTION OF THE PRESENT INVENTION

Figure 3:
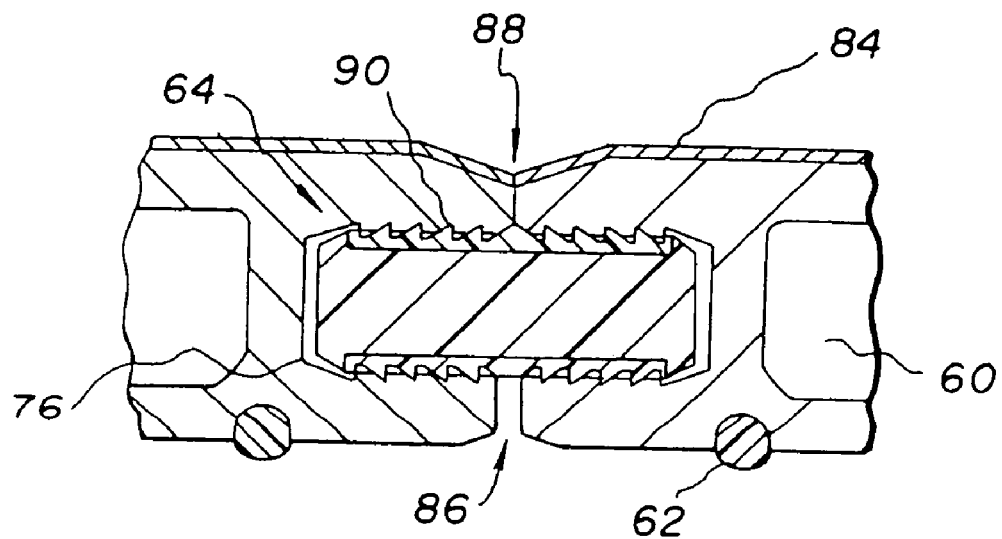
FIG. 3 is a schematic diagram of a sectional view showing another embodiment of a thermoplastic laminate plank of the present invention.

In general, the present invention relates to a thermoplastic laminate plank which contains a core comprising at least one thermoplastic material. This core has a top surface, a bottom surface, and at least four sides or edges. Located or affixed on the top surface of the core can be a print layer having a top surface and a bottom surface. Optionally located or affixed onto the top surface of the print layer is an overlay layer having a top surface and a bottom surface. The thermoplastic laminate plank of the present invention can optionally further include an underlay layer which is located and affixed between the bottom surface of the print layer and the top surface of the core.

In more detail, the core in the thermoplastic laminate plank is made of at least one thermoplastic material. Generally, any thermoplastic material, combinations thereof, alloys thereof, or mixtures of two or more thermoplastics can be used to form the core. Generally, such thermoplastic materials include, but are not limited to, vinyl containing thermoplastics such as polyvinyl chloride, polyvinyl acetate, polyvinyl alcohol, and other vinyl and vinylidene resins and copolymers thereof; polyethylenes such as low density polyethylenes and high density polyethylenes and copolymers thereof, styrenes such as ABS, SAN, and polystyrenes and copolymers thereof; polypropylene and copolymers thereof; saturated and unsaturated polyesters; acrylics; polyamides such as nylon containing types; engineering plastics such as acetyl, polycarbonate, polyimide, polysufone, and polyphenylene oxide and sulfide resins and the like. One or more conductive polymers can be used to form the plank, which has applications in conductive flooring and the like. The thermoplastic polymers set forth in Kirk Othmer ($3^{rd}$ Edition, 1981) at pp. 328 to 848 of Vol. 18 and pp. 385–498 of Vol. 16, (incorporated in their entireties by reference herein) can also be used as long as the resulting plank has sufficient strength for its intended purpose.

Preferably, the thermoplastic material is a rigid polyvinyl chloride but semi-rigid or flexible polyvinyl chloride may also be used. The flexibility of the thermoplastic material can be imparted by using at least one liquid or solid plasticizer which is preferably present in an amount of less than about 20 phr, and more preferably, less than 1 phr. A typical rigid PVC compound used in the present invention to form the core can also include, but is not limited to, pigments, impact modifiers, stabilizers, processing aids, lubricants, fillers, wood flours, other conventional additives, and the like.

The thermoplastic polymer compound to be processed can be in powder, liquid, cubed, pelletized and/or any other extrudable form. Also, the thermoplastic polymer can be virgin, recycled, or a mixture of both. Furthermore, the thermoplastic material can be incorporated with a blowing agent(s) or a mechanically injected gas during the extrusion process to make a cellular foam structure core.

The thermoplastic material used to form the core, which is preferably polyvinyl chloride, is preferably a suspension grade or mass polymerization grade homopolymer resin having a preferred molecular weight as reflected by an inherent viscosity of from about 0.88 to about 1.0 inherent viscosity. In general, a higher molecular weight polymer is preferred from the standpoint of processing stability and preferably the molecular weight distribution and particle size distribution are narrow in order to provide a good balance between processability and properties. Also, high porosity and uniform porosity of the resin particles are preferred to optimize compounding and processing aspects, including the fast and uniform absorption of any stabilizer that is present as well as other ingredients during compounding.

Preferably, the thermoplastic material used to form the core is a rigid PVC powder compound that has good impact strength, ease of processing, high extrusion rate, good surface properties, excellent dimensional stability, and indentation resistance.

The preferred thermoplastic polymer used to form the plank is a polyvinyl chloride from The Geon Company designated X150-206-050-02, which has the following formula:

| FORMULATION | PARTS BY WEIGHT |
| --- | --- |
| Extrusion Grade PVC (0.88–0.96 IV) | 100 |
| Tin Mercaptide Stabilizer | 2–4 |
| PVC Acrylic Processing Aid | 1–3 |
| Filler | 10–30 |
| Impact Modifier (Acrylic) | 3–10 |
| Lubricant Package | 2–5 |
| Pigment | 1–5 |

The polyvinyl chloride preferably has the following properties:

| GEON COMPOUND | ASTM METHOD | 87150 |
| --- | --- | --- |
| Type | | Powder |
| Cell Classification | D1784 | 13344-C |
| Specific Gravity 0.2 | D792 | 1.45 |
| Hardness-Durometer Shore D 3 | D2240 | 82 |
| Tensile Properties - Strength PSI | D638 | 6000 |
| Tensile Properties - Modulus PSI | D638 | 390000 |
| Flexural Properties - Strength PSI | D790 | 11000 |
| Flexural Properties - Modulus PSI | D790 | 370000 |
| Heat Deflection Temperature F Unannealed @ 1.82 MPa (264 PSI) | D648 | 160 |
| Coefficient of Linear Expansion in./in. F | D696 | $3.4 \times 10^{-5}$ |
| Notched IZOD Ft.lb./in. of notch @ 23 C. (73 F.) | D256 | 3 |
| Impact Properties - Drop Impact in.lb/mil @ 375 F. melt T. | D4226 | |
| ¼" Dart H.250 Method A | | 1.0 |
| ¼" Dart H.250 Method B | | 1.0 |
| ⅛" Dart H.125 Method A | | 1.0 |
| ⅛" Dart H.1250 Method B | | 1.0 |

Generally, this compound will have a melt temperature of from about 360 to about 390° F. Preferably, a stabilizer is also present in the thermoplastic formulation that forms the core. A preferred stabilizer is a butyl tin mercaptide stabilizer. In addition, an impact modifier is also preferably present and preferred impact modifiers are acrylic-based from Rohm and Haas, an EVA-based impact modifier known as Elvaloy™ from DuPont; and others such as chlorinated polyethene and acrylonitrile butadiene styrene, and the like.

In addition, the thermoplastic formulation preferably contains at least one processing aid which is preferably an acrylic based low molecular weight resin such as Acryloid K-125 or K-175 from Rohm and Haas. Also, at least one lubricant is preferably present and more preferably an internal lubricant and an external lubricant. Preferred internal lubricants, which act internally to alter the cohesive forces amongst the polymer chains that results in lower melt viscosity without reducing the strength properties of the resin, are metallic stearates such as calcium and zinc salts of stearic acid. External lubricants, which act externally to prevent resins from sticking to hot metal processing machinery by reducing friction between the surfaces, are preferably low-melting paraffins. Fillers are preferably added to the thermoplastic formulation to reduce product cost and to improve impact properties. While any filler can be used as long as it is compatible with the thermoplastic resin, typical fillers include, but are not limited to, calcium carbonate.

The thermoplastic core can be made of a thermoplastic resin and a surface roughening agent, if a rough top surface of the core is desired. Surface roughening agents can impart a non-slip surface to the core or provide a rough surface that is more receptive to some adhesives than a smooth surface would be. Exemplary surface roughening agents include powdered materials having particle sizes of about 1000 microns or less, and may to comprise silicon glass particles, pigments, TEFLON® powders, flour, cornstarch, siliconized glass powders, and micronized cellulosic powders. Inert powders are preferred, including TEFLON® powders, TEFZEL® powders, KYNAR™ powders, polypropylene micropowders, and TULLANOX™ micropowders. The surface roughening agents can be mixed into the thermoplastic melt before the planks are extruded or applied to the surface of the extruded plank while hot, so as to become affixed to the surface.

Preferably, the thermoplastic core is rigid in nature and has the following range of preferred properties: impact resistance, static load resistance, indentation resistance, moisture insensitivity, pre-profiled configuration, and the like.

While the core can be made in a number of ways, preferably the core is formed by an extrusion process wherein the thermoplastic material along with any other optional ingredients are blended together and are then fed into an extruder by a feeder wherein the extruder with the application of heat and auger action melts the thermoplastic material to the extent that it is eventually fed through a die, wherein the die is in the shape of the core.

In more detail, the extrusion process permits a) an economically feasible design by designing a profile with cavities inside the structure and b) a highly versatile method of achieving the complicated profile design of the preferred plank without additional machining afterwards for the tongue and groove, for instance. While any extruder can be used which can extrude the desired design of the plank for thermoplastic materials, preferably the extruder is one from American Maplan corporation such as model TS-88 which has the ability to process rigid PVC profiles with a maximum output capacity of about 900 lb/hr, based upon a compound bulk density of 37 lb/ft$^3$. The TS-88 is a twin screw extruder which has a barrel heating section and a cooling section as well as a vacuum system. In the extruder, there can be 12 temperature zones with 6 for cooling and a temperature control system.

The dimensions of the core can practically be any shape or size as long as such material can be extruded as one piece or multiple pieces. For instance, the core preferably has a thickness of from about 3 mm to about 50 mm, a width of from about 2 cm to about 60 cm, and a length of from about 30 cm to about 215 cm. The core can preferably have a square or rectangular shape. An exemplary core has a width of up to seven inches (18 cm) or more and a length of about 72 inches (183 cm) or more. An exemplary rectangular core has a width of about five inches (13 cm) and a length of about 72 inches (183 cm). Also, the top surface of the core can optionally have a textured surface on the top surface as part of the core which is extruded through the die. The top surface of the plank can also be treated or formed to have a textured finish such as a roughed, grooved, cross-hatched, striated, pitted, cracked, or wood grain texture. A mechanical embossing roller can be located behind the cooling calibrator and after the extrusion die to achieve surface texturing of the extruded core. Any variety of textures can be created by this method on the core such as wood grains and the like.

Figure 5:
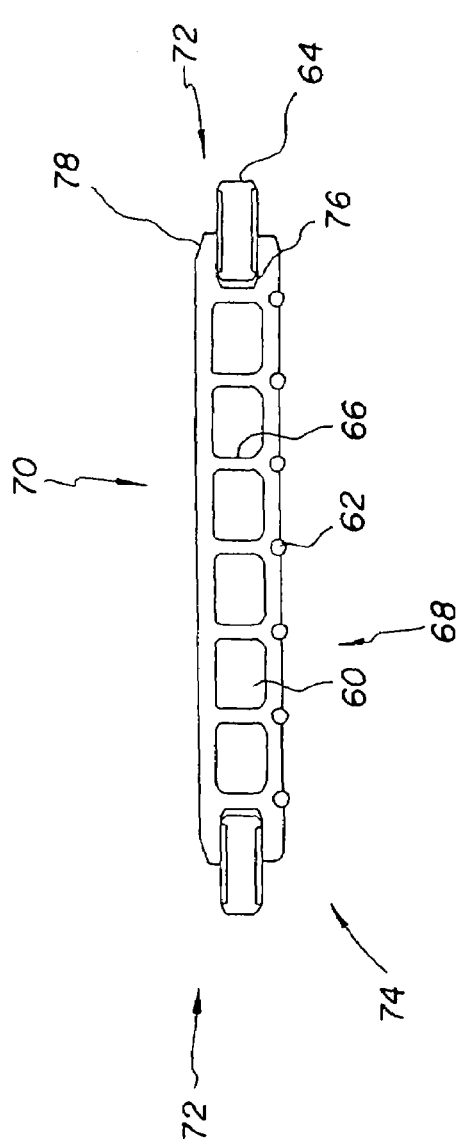
FIGS. 5 and 6 are schematic diagrams showing end views of additional embodiments of the thermoplastic laminate plank of the present invention.
Figure 6:
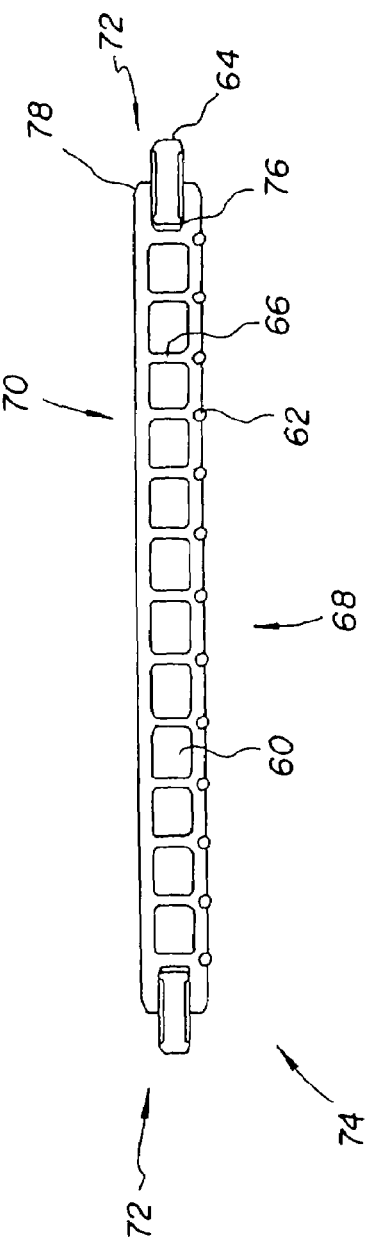

Also, as an option, the core can be 100% solid or can have one or more cavities or cells which are located between the upper and lower surfaces of the core. While the cavities are optional, the cavities are preferred since they reduce the amount of thermoplastic material used and create a lighter weight product. The cavities or cells which can be part of the extruded core preferably have cavities having dimensions of from about 3 mm to about 16 mm in height, by about 6 mm by about 20 mm in width, and can be separated by solid thermoplastic material walls having thicknesses of from about 1.0 mm to about 3.02 mm. The optimal dimension of cavities is dependent upon the requirement of the product to withstand the potential impact force of falling objects. The cavities which are preferably present can be of any cross-sectional shape such as rounded, oval, triangular, or rectangular. These cavities or cells preferably exist across the entire distance of the core as shown in FIGS. 1, 5, and 6. Preferably, each cavity extends longitudinally along the entire length of the plank, although the cavities can instead extend latitudinally along the entire width of the plank. Preferably, the cavities extend in the direction of extrusion of the thermoplastic plank material.

Another advantage is that wires, cables, fiber optics, and/or piping can be run through the cavities which makes installation of wiring and piping quite easy without the necessity of putting holes through walls, or running wires underneath the floor or in the ceiling. Further, if necessary, holes can be drilled through the thermoplastic material separating one cavity from another in order to have the wire or piping go in a perpendicular direction when necessary. Alternatively, for certain thermoplastic core pieces, the cavities can be run in a perpendicular direction from the remaining pieces in order to accommodate the direction that wiring or piping may take when being placed in a room.

According to some embodiments of the invention, electric wires, phone lines, cable television lines, speaker wires, heating elements, hot or cold air conduits, or the like can be integrally extruded within the thermoplastic material of each plank and suitable terminals or connectors, such as pin and hole connectors, can be formed on the ends of the planks and connected to each wire, conduit, or the like. In this manner, a series of planks can be pieced together and carry, for example, a speaker signal from one end of a floor to another end of the floor. Heated or cooled floors can be manufactured having connecting conduits through which adjacent planks can carry hot or cold air.

The cores which form the plank are preferably all made from the same die design and thus they are uniform in appearance. Also, the cavities which are preferably present in the core align with the cavities in respective core pieces. Dowels or other equivalent material can be inserted into the cavities at the short end of the plank in order to join an adjacent plank to create a tight seal at each seam. The ends of the planks can have formed therein grooves for receiving a toothed spline or other connecting member so that the ends of adjacent planks can be joined together in the same manner, or in a similar manner, as the side edges of the planks are joined. The end grooves can be cut or otherwise formed in the extruded planks after extrusion. One end of each plank can be provided with one or more alignment or centering pins while the opposite end of each plank can be provided with one or more recesses, holes, or openings for receiving an alignment pin from an adjacent plank. These types of coupling systems, though optional, will further ensure a very secure tight fitting floating floor or other surface covering.

Though not necessary, the ends of the plank as well as the tongue and/or groove can have a bonding agent applied to these locations in order to seal or bond the planks together. Surprisingly, the inventors have discovered that sealant compositions such as tetrahydrofuran have the ability to actually work as a bonding agent to join the planks together. In one of the examples that follows, the results show that by using tetrahydrofuran or compositions like tetrahydrofuran, the joints of the planks which have been attached with the use of this composition leads to the formation of a bond between the planks and increases the overall bond strength of two adjoining boards significantly. The use of this bonding agent can be used not only with the planks described above but with all thermoplastic planks, provided the bonding agent is capable of solvating or dissolving the particular plastics to form a chemical and/or mechanical bond. One advantage of using a bonding agent like tetrahydrofuran is that it is effective, it is simple to use, and leaves no residue on the surface after evaporation. Thus, no adhesive marks are left on the surface of the planks. In addition, applying such bonding agents like tetrahydrofuran is quite easy since it can be applied by brush or spray or applicator tip using gravity or other force such as squeezing an applicator bottle, and any excess is easily removed unlike the application of some adhesives for tiles and the like. Other examples of other suitable bonding agents which have this ability to bond the thermoplastic planks include, but are not limited to, methylene chloride and ketones and the like. Examples of ketones include, but are not limited to, methyl ethyl ketone, methyl amyl ketone, dipropyl ketone, methyl isobutyl ketone, n-methyl pyrrolidone, dimethyl formamide, cyclohexanone, nitrobenzene, and the like.

Another optional aspect of the core is the presence of a groove and/or a tongue design on preferably two or more sides or edges of the core wherein the sides or edges are opposite to each other. While the core design can have a tongue design on one edge and a groove design on the opposite edge, it is preferred that both edges which are opposite to each other have a groove design. This tongue and/or groove design on the core can be formed as part of the extruded core. The tongue or groove can have a variety of dimensions but preferably the groove which is present on two, opposite edges has internal depth dimension of from about 5 mm to about 12 mm and a height of from about 3 mm to about 5 mm. The bottom width of the side having the groove is slightly shorter than the upper width of the same side to ensure no gap exists between planks after butting together. In other words, the bottom lip of the groove is slightly narrower than the top lip, ensuring the top lip of laterally-adjoining planks will meet before the bottom lips. This ensures no visible surface gap. In addition, it is preferred that the groove have teeth located on the upper surface and lower surface of the groove to receive an interlocking tongue, wherein the tongue is a separate component which will be described later. The teeth which can preferably be present as part of the extruded groove forming part of the extruded core are preferably from about 0.2 mm to about 1.2 mm in size for each tooth and having an angle of from about 30 to 45 degrees with a backward bite enabling easier insertion than removal of the tongue portion. A preferred design is set forth in FIGS. 3 and 4.

Also, as an option, any edge, and preferably the edges which preferably have the tongue and/or groove, are preferably tapered or beveled so that when two cores are brought together for attachment, a valley or V-shaped recess is formed. Preferably, the tapered or beveled edges are at an angle of from about 15° to about 55°, and more preferably at about a 17° angle. Also, the length of the beveled or tapered edge is about 2.0 mm to about 7.0 mm on each core piece. A preferred design is set forth in FIG. 3.

As another option, the core can have located on its bottom surface any number of bottom feet which are preferably pieces of rubber or thermoplastic material which are attached to the bottom surface of the core. Preferably, the bottom feet are thermoplastic material and more preferably are soft thermoplastic material which are post-extruded onto the bottom surface of the plank. While the bottom feet can have any dimensions, preferably the bottom feet have an outer dimension of from about 1.0 mm to about 5.0 mm. The bottom feet provide numerous functions such as increasing the soft, cushion feeling of the plank to improve foot comfort level and also reduces the problems associated with sub-floor or substrate imperfections. The bottom feet can also assist in controlling sound transmissions, and thus have sound deadening properties. Also, the bottom feet ensure that migration from any mold, mildew, and/or stain which may be part of the sub-floor or substrate can be minimized if not eliminated by the bottom feet.

As an additional option, the product with bottom feet can be installed up side down to make a slip resistance floor for such applications as escalators or stairways.

The bottom feet are located on the bottom surface of the core and preferably appear as a series of raised parallel rods running longitudinally along the bottom of the plank. These may be formed by post-extruding soft polymeric rods into depressed grooves present in the extruded core plank bottom. These raised feet extend outward from the bottom of the plank and act to support the core above the subfloor or substrate. Typically, the post extruded material extends beyond the bottom surface from the core by about 10 mils (0.25 mm) to about 75 mils (2.0 mm), and more preferably from about 25 mils (0.65 mm) to about 50 mils (1.3 mm). FIGS. 1, 3, 5, and 6 further show embodiments of how the post extruded rods of thermoplastic material can serve as a support mechanism.

With respect to the laminate on top of the core, a print layer is affixed to the top surface of the core, wherein the print layer has a top surface and a bottom surface. The print layer preferably is an aminoplast resin impregnated printed paper. Preferably, the print layer has a printed design. The printed design can be any design which is capable of being printed onto the print layer. The print layer is also known as a decor print layer. Generally, the print layer can be prepared by rotogravure printing techniques or other printing means such as digital printing. Once the paper has the design printed on it, the paper is then impregnated with an aminoplast resin or mixtures thereof. Preferably the aminoplast resin is a blend of an urea formaldehyde and a melamine formaldehyde.

The print paper, also known as the Deco paper, preferably should have the ability to have liquids penetrate the paper such as a melamine liquid penetrating in about 3 to 4 seconds and also maintain a wet strength and even fiber orientation to provide good reinforcement in all directions. The print paper used doesn't need to impregnate with the resin (this is optional), but instead relies on slight resin migration from the adjoining layers during the lamination process (applying heat and/or pressure to laminate all layers to one). Preferably, the resin used for the impregnation is a mixture of urea formaldehyde and melamine formaldehyde resins. Urea formaldehyde can contribute to the cloudiness of the film that is formed and thus is not preferred for dark colors and the melamine resin imparts transparency, high hardness, scratch resistance, chemical resistance, and good formation, but may have high shrinkage values. Combining urea resins with melamine resins in a mixture or using a double impregnation (i.e., applying one resin after another sequentially) provides a positive interaction in controlling shrinkage and reducing cloudiness. Preferably, the type of paper used is 75 g/m² weight and having a thickness of 0.16 mm. The saturation of the coating preferably is about 64 g/m².

Located optionally on the top surface of the print layer is an overlay. The overlay which can also be known as the wear layer is an overlay paper, which upon being affixed onto the print layer, is clear in appearance. The overlay paper is preferably a high abrasive overlay which preferably has aluminum oxide embedded in the surface of the paper. In addition, the paper is impregnated with an aminoplast resin just as with the print layer. Various commercial grades of high abrasive overlays are preferably used such as those from Mead Specialty Paper with the product numbers TMO 361, 461 (70 gram/m² premium overlay from Mead), and 561 wherein these products have a range of Taber values of 4000 to 15000. The type of paper preferably used has a weight of about 46 g/m² and a thickness of about 0.13 mm.

With respect to the print layer and the overlay, the amount of aminoplast resin is preferably from about 60 to about 140 g/m² and more preferably from about 100 to about 120 g/m².

As an option, an underlay can be located and affixed between the bottom surface of the print layer and the top surface of the core. Preferably the underlay is present and is paper impregnated with an aminoplast resin as described above with respect to the print layer and overlay. Preferably, the underlay is Kraft paper impregnated with aminoplast resins or phenolics and more preferably phenolic formaldehyde resin or melamine formaldehyde resin which is present in an amount of from about 60 g/m to about 145 g/m and more preferably from about 100 g/m² to about 120 g/m² paper. The type of paper used is preferably about 145 g/m² and having a thickness of about 0.25 mm. The underlay is especially preferred when extra impact strength resistance is required.

Preferably, the thermoplastic laminate plank can be prepared by extruding the core as described above and forming a laminate comprising the overlay affixed to the top surface of the print layer and optionally the underlay layer which is affixed to the bottom surface of the print layer. This laminate can be prepared, for instance, by any process customarily used to manufacture laminate films such as a continuous double belt press. In general, the underlay, if used, the print layer and the overlay can be fed into a continuous double belt press that serves as a laminating calendar. Preferably, the continuous operation is an isobaric system wherein pressures can go as high as 30 bar and the line speed can be up to 20 meters per minute. The pressure zone length is about 2–3 meters. In this continuous double belt press system, the isobaric system provides a steady uniform pressure effect on each point of the treated surface of the laminate. Embossing of the laminate can be accomplished by embossed release paper or the belt of the double belt press can be embossed to produce surface textures. In a continuous double belt press, the simultaneous heating of the laminate with proper dwell time and pressure forms the laminate film which can then be rolled up for subsequent application. Once the laminate is formed it can be applied onto the core and is preferably affixed by any means, such as with an adhesive. Preferably the adhesive is a hot melt adhesive such as a hot melt glue like hot melt polyurethane glue.

The hot melt adhesive, such as the hot melt polyurethane adhesive, is preferably applied to the back surface of the laminate film at a preferred temperature of from about 250° F. to about 300° F., more preferably from about 250° F. to about 275° F. These temperatures may vary slightly depending upon the adhesive. The application of the hot melt adhesive to the laminate can be done by a direct roll coater. The laminate with the adhesive on the back surface can then be heated to an adequate temperature to soften the laminate and allow the laminate to form to the profile of the thermoplastic core and thus be affixed permanently. The typical wrapping machine is designed to hold the laminate to the contour of the thermoplastic plank as it is being cooled to below about 90 to about 100° F. The thickness of the application of the adhesive can have an effect on the impact resistance of the finished product. If the application of the adhesive is too thick, an impact may cause the laminate to become brittle and crack. A thin application enables the laminate to flex less during impact and minimize the damage. Application of the adhesive is preferably made at a rate of from about 5 to about 15 grams per square foot (g/ft$^2$) and more preferably from about 4 to about 8 g/ft$^2$. A preferred hot melt adhesive is Ever-Lock® 2U145/2U230 modified polyurethane adhesive reactive hot melt from Reinhold Chemicals, Inc.

As described earlier, the various laminate planks of the present invention can be connected together by a tongue piece or spline or snap connector. A separate spline or snap connector is a separate piece and is especially effective when a groove is present on two opposite sides or edges of the thermoplastic laminate plank. The snap or tongue piece can be inserted into one groove and is long enough to extend outside the groove and fit into a respective groove of another thermoplastic laminate plank in order to connect the two pieces together. Preferably, the tongue piece or snap connector is a co-extruded material that is made of a rigid thermoplastic material such as polyvinyl chloride or polyvinyl chloride/rubber blends in the central portion and a soft thermoplastic material such as soft polyvinyl chloride at the top and bottom surface of the snap connector in order to be flexible when inserted into the groove so as to securely engage the teeth portions of the groove in the preferred embodiment.

The snap connector is designed for ease of installation. To achieve this objective is to mechanically interlock two planks together with a connector without using glue. The connector is to fit into the side grooves of two adjoining planks. The purpose of the snap connector includes holding the planks together and preventing water pooled on the top of the joint from penetrating totally through the joint and wetting the subfloor or surface under the planks.

The snap connector, also known as a spline, has a width large enough to allow the teeth in each adjoining groove to grip the connector satisfactorily, but the snap connector must be narrower than the combined groove depths of the adjoining planks to allow the tops of the planks to come together (See FIG. 3). Thus, the snap connector should be as wide as possible to provide maximum grab surface, but should be narrow enough to allow the top surfaces of the adjoining planks to meet. The width of the snap connector would preferably range from about 0.007 to about 0.013 inches less than the nominal groove depth to allow for processing variability. To increase the "bite" of the teeth in the groove onto the surfaces of the connector, the top and bottom surfaces of the connector may be made of a softer material than the core of the connector. This material may be comprised of plasticized vinyl, a vinyl rubber blend, and the like. One such embodiment contains a hard inner core made of GEON 8700 compound with a total thickness of about 2 mm to about 3 mm with a top and bottom surface made of GEON 8602 product with thickness of from about 1.3 mm to about 3 mm for each surface.

The snap connector may have a variety of configurations. In one such configuration, the top and bottom surfaces are flat. This will allow the teeth in the top and bottom surfaces of the adjoining grooves to grip the connector. The thickness of the connector is determined by two factors. The thicker the connector, the more pressure the groove teeth will apply. However, the connector can not be too thick or the force needed by the installer to drive the adjoining planks together will be too high. In the case of the connector design with flat top and bottom surfaces, the connector thickness will range preferably to no more than about 0.13 mm to about 0.26 mm more than the groove opening of the plank into which it is being inserted.

Another configuration includes sets of teeth running longitudinally down the length of the connector. These teeth may appear on both top and bottom surfaces or only on one surface with the other surface being flat. The teeth preferably will be configured to slant in the opposing direction to the teeth in the plank groove, thus allowing an "interlocking effect".

Due to the flexibility of the teeth, a greater extrusion tolerance for the side groove of the plank can be accommodated. The total thickness of the connector may be in excess of 0.9 mm greater than the plank groove opening and the force required for installation is still acceptable. The flexibility of the teeth in the connector will depend on the material of which it is made. One such embodiment contains a hard inner core made of GEON 8700 compound with a total thickness of about 2.8 mm and a top and bottom surface made of GEON 8602 product with thickness of about 0.76 mm for each surface. The top and bottom surfaces can contain a soft flat layer of about 0.25 mm from which teeth 0.5 mm long protrudes.

Another configuration allows depressed serrated "valleys" running longitudinally in the direction of the connector. These depressed serrations will allow teeth of the grooves in the plank to more easily mate into the connector.

In the present invention, while each of the thermoplastic laminate planks can be affixed to the sub-floor or substrate, it is preferred that the thermoplastic laminate planks be attached only to each other through the groove system such that there is a floating floor system. This promotes fast and easy laying of the floor system.

With the thermoplastic laminate planks of the present invention, the present invention achieves many benefits and advantages, such as moisture resistance, mechanical properties such as impact strength, resistance to indentation and gouges, and beneficial acoustical properties. Further, the laminate plank system of the present invention can be used in any environment, dry or wet, indoor or outdoor since it is not susceptible to moisture damage or distortion. In an embodiment of the present invention, the planks are less sensitive to the combined effects of temperature and humidity than is the standard laminate product. As a result, the need for T-moldings to act as expansion and contraction areas of the floor can generally be eliminated. These T-moldings are not only unsightly, but can act as tripping hazards. By the elimination of T-moldings/expansion joints in the walkway, the present invention allows the use of the floor in commercial applications. In an embodiment, the present invention expanded only one fifth as much as a standard laminate product under identical conditions. These conditions take the product from ambient room conditions to conditions of 100% relative humidity and 90° F. Standard expansion joints for laminate are typically placed every 30 feet. Thus, a hallway of 150 feet would be feasible without an expansion joint according to the present invention.

A second study shows that by post conditioning the planks, such as at 240° F. for varying times of from 20 to 40 seconds, the planks may be rendered even more stable. This treatment is referred to as thermal balancing. Results are described in the table below.

| Description of Flooring | Growth in Width** | Growth in Length** |
| --- | --- | --- |
| Plank #1* | 0.03% | 0.03% |
| Plank #2* | 0.03 | 0.03 |
| Plank #3* | 0.04 | 0.03 |
| Laminate Plank (Comparison) (Commercial product) | 0.10 | 0.20 |

*present invention
**Conditions start at ambient room conditions. Product expands during change to 90° F. and 100% RH.

Also, in the preferred embodiment of the present invention, the installation method used as a result of the unique designs of the thermoplastic laminate planks of the present invention, preferably eliminates the glue needed for tongue and groove connections.

In the preferred embodiment of the present invention, the installation method utilizes the unique design of the product to eliminate the need for glue used in tongue and groove connections.

Furthermore, the installer has options for installing the thermoplastic laminate plank product. In one method, a floating floor installation method can be utilized. In this method, no adhesive is applied to bond the product to the subfloor surface. The benefits of this method have been described earlier.

In a second method, a full-spread adhesive is applied between the underside of the product and the sub-floor surface. This provides the advantages of added dimensional stabilization and sound deadening. Both of these properties would be beneficial in commercial applications.

In addition, the excellent moisture resistance and sound deadening qualities of this product can eliminate the need for underpadding, though use of underpadding is an option.

A further embodiment of the present invention relates to a thermoplastic plank which comprises the same plank described above but, in lieu of a laminate on top of the plank, a design is printed directly on the top surface of the plank using any number of printing techniques such as gravure printing, transfer printing, digital printing, flexo printing, and the like. Or, a printed thermoplastic film (e.g., PVC) or a wood veneer and the like can be laminated to a thermoplastic plank. A protective coating can then be placed on top of the printed design. Any type of protective coating or wear layer can be used such as a polyurethane type coating with or without wear resistant particles in the coating. Thus, a thermoplastic plank would comprise a core comprising at least one thermoplastic material where the core has a top surface and bottom surface as well as opposing sides and a printed design directly on the top surface of the plank and optionally at least one protective coating on top of the printed design. The top surface of the plank as described earlier, can have a textured surface as described above.

This type of thermoplastic plank can be made by extruding at least one thermoplastic material into the shape of the core and then printing a design directly on the top surface of the plank and then optionally applying at least one protective coating on top of the printed design and curing the protective coating. The protective coating can be applied by conventional techniques, such as curtain coater, direct roll coater, differential roll coater or air knife coater or spray apparatus.

In another embodiment of the present invention, a thermoplastic plank for surface coverings, such as flooring, has a thermoplastic core as described above in the other embodiments and a extruded layer on the top surface of the core wherein this extruded layer comprises at least one thermoplastic material with one or more pigmented compounds. This extruded layer on top of the extruded core can simulate various designs such as wood grain and the like.

The thermoplastic plank in this embodiment can be made by co-extrusion techniques which involve extruding at least one thermoplastic material into the shape of a core and extruding either simultaneously or subsequently a layer containing at least one thermoplastic material with one or more pigmented compounds on top of the extruded core.

Another embodiment involves a thermoplastic plank having the same design as described above with a printed polymeric film, such as a PVC film placed on the top surface of the extruded core. The printed polymeric film can be a polymeric film having a printed design on the film wherein the film would preferably be from about 10 to about 20 mil thick. One or more wear layers or protective coatings can be placed on top of the printed polymeric film. The polymeric film can be placed on top of the extruded core by typical lamination techniques such as heating the printed film, then pressing the film to the extruded core to bond them together, or using glue to bond them together.

In more detail and with reference to the Figures, the Figures show various aspects of several embodiments of the present invention. In each of FIGS. 1–6, the length measurements shown are in units of inches and angle values are shown in degrees. For each measurement set forth in decimal form, the tolerance is +/−0.005 inch per measurement. For each measurement set forth in fraction form, the tolerance is +/−1/16 inch per measurement. For each angular measurement, the tolerances is +/−0.5°.

With reference to FIG. 1, FIG. 1 represents a schematic diagram of an end view of one embodiment of the thermoplastic plank. FIG. 1. is a perspective view looking at the front edge of the thermoplastic plank wherein the groove (76) would run along each longitudinal edge of the plank. The spline or tongue (64) is inserted along the length of each groove (76). (72) points to the edges of the spline having the groove whereas (68) points to the lower or bottom surface of the plank and (70) points to the top surface or the surface that typically but optionally receives the print layer and the like. (62) refers to the feet or strips of post-extruded material which extend along the bottom surface of the core from the front edge to the back edge. As can be seen in FIG. 1, typically these post extruded lines of thermoplastic material act as a support mechanism and typically run parallel in the same parallel direction as the cavities (60). Preferably, and as shown in the embodiments in FIG. 1, the edge side of the plank which has a groove is typically tapered or beveled as shown at (78). The cavities (60) are shown in FIG. 1 as having rectangular cross-sections. The cavities extend longitudinally along the length of the plank, preferably along the entire length of the plank from one end to an opposing end.

In the embodiment of FIG. 1, the overall width (from left to right in the view shown) of the plank is 7.000 inches (178 mm) not including the splines or tongues 64 shown connected at each end of the plank. The length of the plank (not shown) is 72 inches (1829 mm). The width of each cavity (shown from left to right) is 0.335 inch (8.51 mm). The vertical dimension of the upper and lower wall thicknesses above and below each cavity is 0.070 inch (1.78 mm) each. The height (in a vertical dimension) of each cavity is 0.215 inch (5.46 mm). The width (from left to right) of the vertically disposed side walls between adjacent cavities is 0.060 inch (1.52 mm) with the exception of the outermost side walls adjacent the grooves 76, which each have a width of 0.116 inch (2.95 mm).

Referring to FIG. 2, FIG. 2 is a representation of one type of spline or tongue (64) that can be used in one embodiment of the present invention. As can be seen in FIG. 2, the preferably soft material (82) such as PVC is located on the top and bottom surface of the spline or tongue in order to ensure a tighter fit with the groove of the thermoplastic plank.

The spline design preferably has a thickness of from about 3 mils (0.13 mm) to 5 mils (0.26 mm) thicker than the groove of the plank. If the spline is too thick, it can open the groove and cause edge peaking. If the spline is too thin, it does not effectively engage with the teeth in the groove. The edges of the spline or tongue (64) are tapered or beveled as shown at (80) in order to ensure that the tongue can be inserted into the groove.

In the embodiment shown in FIG. 2, the overall width of the spline or tongue 64 (from left to right) is 0.500 inch (12.7 mm) and the overall height is 0.180 inch (4.57 mm). The thickness of the soft material 82 shown on the top and bottom of the spline or tongue is 0.023 inch (0.58 mm). For each of the top and bottom surfaces of the spline, the respective surface is made up of 0.064 square inch (1.63 mm) of a rigid polyvinylchloride (PVC) material and 0.019 square inch of a soft polyvinylchloride material. The angled corners of the spline or tongue 64 are each angled about 30° with respect of the flat top and bottom respective adjacent surface of the spline or tongue 64.

FIG. 3 makes reference to a spline (64) which has teeth (90) on its surfaces which engage the grooves (76) of the thermoplastic planks. Further, as can be seen in FIG. 3, in a preferred embodiment, the top surfaces of the plank form a V shape valley (88) and the top edges of the adjacent planks touch each other whereas the bottom edge portions of each respective plank are cut in order to have a slightly shorter length and thus form a gap (86) which ensures that the top ends (88) touch each other and do not leave any gaps on the walking surface of the planks. Reference numeral (84) shows a top layer, such as a print layer, a composite print layer, or the like.

In the embodiment shown in FIG. 3, the width dimension of the gap 86 (from left to right) is 0.030 inch (0.76 mm). The thickness of the top layer 84 shown in FIG. 3 is 0.015 inch (0.38 mm). The surface area, viewed from the bottom, of the feet or strips 62 of post-extruded material is 0.0048 square inch (0.122 mm) each and they are made of a soft polyvinyl chloride material. The total surface area, covered by feet or strips 62, of the bottom of either plank shown connected in FIG. 3 is 0.0624 square inch (1.60 mm). The two connected planks shown in FIG. 3, each have dimensions of from about 7.0 inches in width and about 72 inches in length, and each is provided with 13 feet or strips 62.

Figure 4:
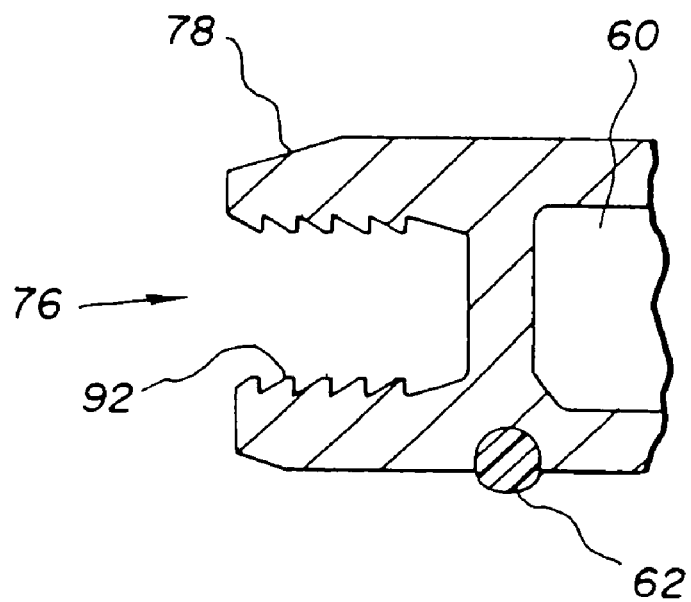
FIG. 4 is a schematic diagram showing a groove design for a connector useful in connecting the planks of the present invention.

Referring to FIG. 4, FIG. 4 is a depiction of a groove (76) which has receiving teeth (92) for a spline or tongue of the design shown at (90) in FIG. 3. FIG. 4 further shows the post extruded lines (62) on the bottom surface of the extruded plank as well as the various angles and cuts of the cavity (60). Further, the beveled or tapered edge (78) is shown in FIG. 4.

In the embodiment shown in FIG. 4, the foot 62 has a width of 0.075 inch, a height of 0.075 inch, and is housed in a corresponding groove or hole that extends 0.050 inch into the bottom surface of the flooring plank. As such, 0.025 inch of the foot extends past the bottom surface of the plank. The cavity 60 shown in FIG. 4 has an upper corner defined by a radius of curvature of 0.025 inch and a bottom corner including a 45° angle wall that intersects with the side wall and the bottom wall of the cavity in radii of curvature of 0.025 inch each. The beveled or tapered edge 78 shown in FIG. 4 is angled in an amount of 17° relative to the flat top surface of the plank. The beveled or tapered bottom edge opposite edge 78 is angled in an amount of 30° relative to the flat bottom surface of the plank. The receiving teeth 92 are each 0.040 inch wide (from left to right) and each has a flat top surface at its point that has a width of 0.008 inch. The gap between opposing top and bottom teeth is 0.150 inch. The depth of the groove 76, from the edge of the plank to the deepest part of groove 76 (from left to right) is 0.270 inch and the depth from the left edge of the plank to and including the last tooth within the groove is 0.201 inch. The beveled or tapered edge 76 intersects with the flat top surface of the plank 0.125 inch from the edge of the plank.

FIGS. 5 and 6 represent various different widths of the plank but generally show the same features as shown in FIG. 1 and the reference numerals in FIGS. 5 and 6 represent the same features as the corresponding numerals represented in FIG. 1.

The dimensions of the cavities and wall thicknesses of the embodiment shown in FIG. 5 are substantially identical to the dimensions shown in FIG. 1 with the exception that the overall width of the plank shown in FIG. 5 is 3.000 inches as opposed to 7.000 inches for the width of the plank shown in FIG. 1. In addition, the two vertical side walls adjacent each respective gap 76, herein referred to as the two outermost side walls, are 0.075 inch in width as opposed to 0.116 inch in width for the corresponding outermost side walls of the embodiment shown in FIG. 1. The overall height of the plank shown in FIG. 5, from the flat top surface to the flat bottom surface (excluding the feet or strips 62) is 0.355 inch for the embodiment shown in FIG. 5.

For the embodiment shown in FIG. 6, the dimensions are substantially identical to those dimensions shown in the embodiment of FIG. 5, with the exception that the plank shown in FIG. 6 has an overall width of 5.000 inches and each cavity has a width of 0.303 inch.

Figure 7:
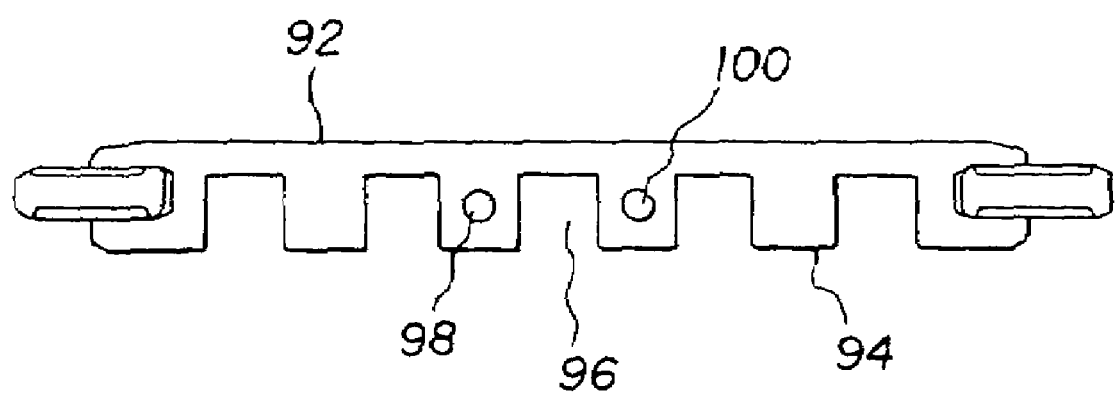
FIG. 7 is a schematic diagram showing an end view of an additional embodiment of the thermoplastic plank of the present invention.

FIG. 7 depicts yet another embodiment of the thermoplastic plank according to the present invention. FIG. 7 is an end view of an embodiment wherein the extruded thermoplastic plank has a substantially planar top surface (92), and a bottom surface (94) having a plurality of channels formed therein, wherein each channel (96) extends longitudinally from one end of the plank to the other end of the plank. The channels can be U-shaped, ⊔-shaped, or have any other suitable cross sectional shape. The channels (96), when the planks are in place on a floor, can house any of a variety of electrical or signal-carrying wires, cables, cords, or conduits. The plank is significantly lighter than a similar plank having the same dimensions but without having the channels formed therein. A flooring system made of such planks has a softer feel and a lighter weight than an otherwise similar but solid plank. As shown in FIG. 7, a centering pin (98) and a pin receiving hole (100) are each provided on both ends of the plank so that adjacent planks can be aligned with each other in an end-to-end configuration.

The thermoplastic planks of the present invention can be used in a variety of applications including, but not limited to, wall panels, ceiling panels, flooring surfaces, decks, patios, furniture surfaces, shelving, and other surface coverings or parts thereof.

The present invention will be further clarified by the following examples, which are intended to be purely exemplary of the present invention.

EXAMPLES

Example 1

Compound:

In one case a PVC compound containing impact modifier, filler, stabilizer and processing aids in the amounts below was extruded through a profile die giving a hollow cross section as shown in FIGS. 1, 5, and/or 6.

| Ingredient | Amount (phr) | | | | |
|---|---|---|---|---|---|
| PVC Homopolymer | 100 | | | | |
| Thermal Stabilizer | 0.8–1.5 | | | | |
| Processing Aid | 0.5–1.0 | | | | |
| Impact Modifier | 3.0–4.0 | | | | |
| Lubricant  internal | 0.6–1.0 | | | | |
|           external | 1.1–1.5 | | | | |
| Filler | 20–35 | | | | |
| $TiO_2$ | 1.5–3.0 | | | | |
| Barrel | Barrel 1 | Barrel 2 | Barrel 3 | Barrel 4 | Barrel 5 |
| Temperatures, deg. F. | 345–360 | 345–360 | 320–340 | 315–330 | 90–110 |
| Oil Temperature deg. F. (through screw) | 285–300 | | | | |
| Die | Die 1 | Die 2 | Die 3 | Die 4 | Die 5 |
| Temperatures, deg F. | 345–360 | 360–370 | 360–370 | 380–390 | 370–380 |
| Percent Load | 63–75% | | | | |
| Main RPM | 950–1100 | | | | |
| Output | 356–550 pounds/hr (163–250 kg/hr) | | | | |
| Back Pressure | 18.1–19.0 metric tons | | | | |
| Melt Pressure | 4,075–4500 psi | | | | |
| Melt Temperature, deg. F. | 385–390 | | | | |
| Color Feeder | 0.35–0.70 pounds/hr (setting of 5 for 0.35, setting of 10 for 0.70) | | | | |
| Line Speed | 8.5–8.75 feet/min | | | | |
| Calibration Unit: | | | | | |
| Vacuum 1 | 16–20 in Hg | | | | |
| Vacuum 2 | 17–20 in Hg | | | | |
| Vacuum 3 | 12.5–15.0 in Hg | | | | |
| Vacuum 4 | off | | | | |
| Puller Force | 3560–4000 pounds | | | | |
| Water Temperature, ° F. | 61 | | | | |
| Pressure at Cooling and Sizing, psi | | | | | |
| #1 | 40 mbar | | | | |
| #2 | 40 mbar | | | | |
| Clamping Pressure at conveyor | | | | | |
| Front | 40–45 psi | | | | |
| Back | 28–35 psi | | | | |
| Counterbalance | 33–40 psi | | | | |

Specific Applications Wrapping Conditions:

Layout of Line/Conditions:

A machine was used to form the HPL (High Pressure Laminate top layer) onto the PVC Plank Base. The machine was called a "wrapping machine" and is composed primarily of two main parts 1) a forming action component to shape the HPL to the contour of the base, and 2) a clamping action component to retain the HPL shape onto the base as the adhesive cools and strengthens.

In more detail:

1. PVC Planks were placed onto the line to be conveyed through by rubber covered roller wheels. Speed of conveyance was 35–50 feet per minute in this particular application. In other applications, speeds may range as high as 120 fpm.

2. PVC Planks underwent surface treatment to raise surface tension and improve the wetting of adhesive onto the surface. The surface treatment unit which was from Corotec, 145 Hyde Rd, Farmington, Conn., provided plasma jet treatment. The surface tension was raised from 34 to 45+ dynes/cm.

3. HPL (laminate) top layer, dispensed in a continuous roll, was treated with a polyurethane hot melt adhesive, Reichold 2U145, available from Reichold Chemicals, 2400 Ellis Rd, Durham, N.C. The adhesive was heated to 237 degrees F. and rolled onto the back of the HPL layer with a knurled roll.

4. The HPL was then mated to the PVC Plank, and IR heat was directed onto the face of the HPL. Temperature on the face of the PVC Plank was raised to 300° F.–330° F., which softens the HPL enough to allow shaping.

5. The HPL was shaped using rubber rollers onto the face of the PVC plank and down the beveled edges of the plank. As such, this wrapping process shaped the HPL to adhere to the topography of the plank onto which it is being affixed.

6. Water spray quickly lowered the temperature of the HPL/PVC Plank assembly to below 100° F. (e.g., 94° F.). Rubber rollers continued to hold the HPL onto the PVC surface while the assembly cooled further. This allowed the adhesive to cool and strengthen, thereby permanently affixing the HPL top layer to the PVC Plank lower layer.

7. Each individual plank assembly was then separated from the following planks with a force appropriate to make a sharp separation.

Post-Treatment:

Mechanical Post-Treatment

The HPL/PVC Plank assembly was then finished with end cutting and edge trimming procedures to cut the board ends square and trim the laminate overhang flush to the base plank.

Thermal Post-Treatment

Due to the uneven top-side heating of the HPL/PVC Plank assembly during shaping, the finished product can develop a "cup" distortion where the top ends of the plank come closer together. In order for the plank to lie flat, this must be countered with an opposing thermal treatment on the back side of the HPL/PVC Plank Assembly. Thermal treatment can be done in line by directly heating (in an upward direction) the bottom surface of the plank while the plank is undergoing the wrapping process.

For the specific HPL/PVC Plank geometry shown in FIG. 1, it has been found that by heating the back surface of the assembly to certain temperatures for certain times, the shape of the board can be controlled. In fact, the cupping can be corrected and a flat plank produced if the board is heated to 240–300 degrees F. for 20–45 seconds.

If the board is allowed to reside at higher temperatures for longer times, a "doming" can actually be induced into the board. So total control of the ultimate shape of the board can be achieved by appropriate selection of conditions.

The thermoplastic plank of the present invention was tested for properties and compared to commercially available Mannington laminate and wood flooring products.

The can drop test involved dropping a 2 lb can from 40 inches high, wherein 100% means a puncture of the product and 0% means no chip off.

Extrusion Plank Testing

| Test Designation | Mannington Product | | Extrusion Plank | |
|---|---|---|---|---|
| | Laminate | Wood | Plank Only | With Overlay |
| Taber Abrasion, cycles to IP | 9880 | 125 | 5 mils @ 500 | 5590 |
| Can Drop, mils indent* | | | | |
| MD, no feet | 30, 100% cat | 50, 100% cat | 5, 16% cat | 5, 0% cat |
| AMD, no feet | 30, 100% cat | 31, 100% cat | 1, 0% cat | 1, 0% cat |
| MD, with feet | — | — | 7, 28% cat | 5, 60% cat |
| AMD, with feet | — | — | 1, 0% cat | 0, 0% cat |
| Pneumatic Indent, mils indent | | | | |
| No feet | 0 | 3.6 | 0.2 | 0 |
| With feet | — | — | 0.2 | 0.2 |
| Two hour stain | | | | |
| KC-261 Asphalt (Sealer) | 0.5 | 0 | 3 | 0 |
| Shoe Polish | 0 | 1 | 0 | 0 |
| Oil Brown | 0.5 | 0 | 0 | 0 |
| Mustard | 0 | 0 | 0 | 0 |
| Chemlawn | 0 | 0 | 0 | 0 |
| Blue Sharpie | 0.5 | 0.5 | 0.5 | 0 |
| Iodine | 0 | 3 | 0 | 0 |
| Total Stain | 1.5 | 4.5 | 3.5 | 0 |
| Static Load, mils indent | | | | |
| No feet | 0 | 1 | 0 | 0 |
| With feet | — | — | 0 | 0 |
| Sliding Gouge MD, no feet | | | | |
| 250 psi | pass | pass | pass | pass |
| 300 psi | pass | fail | pass | pass |
| 350 psi | pass | fail | pass | pass |
| AMD, no feet | | | | |
| 250 psi | pass | pass | pass | pass |
| 300 psi | pass | fail | pass | pass |
| 350 psi | pass | fail | pass | pass |
| MD, with feet | | | | |
| 250 psi | — | — | pass | pass |
| 300 psi | — | — | pass | pass |
| 350 psi | — | — | pass | pass |
| AMD, with feet | | | | |
| 250 psi | — | — | pass | pass |
| 300 psi | — | — | pass | pass |
| 350 psi | — | — | pass | pass |
| Two hour boiling water | fail | fail | pass | pass |
| Large ball impact, inches to failure | | | | |
| No Feet | 14 | 10 | 32, no failure | 32, no failure |
| With Feet | 32, with pad | — | 32, no failure | 32, no failure |

This row indicated "cat" as catastrophic failure meaning puncture through.

Example 2

A series of thermoplastic planks similar in design to the planks formed in Example 1 were connected together to create a flooring system. The spline system as set forth in FIG. 3 was used. In addition, a comparison was made with using no bonding agent and a flooring system using a bonding agent. The bonding agent, tetrahydrofuran (THF) was applied to all sides of the plank including the spline and grooves. When no THF was applied to the spline area, the bonding strength was an average of 1.73 pounds using the Instron test with the following parameters: 50 pounds full scale for the chart paper, 0.5 in/minute jaw speed, 3 inch jaw distance, 1×5 sample, 156 mil spline thickness. When the same type of extrusion plank had THF applied to the spline area, after 4 hours curing, the bonding strength of the spline area was an average of 18.1 pounds and after 24 hours curing, the bonding strength of the spline area was 39.1 pounds. The ends of the extrusion plank were tested for bonding strength wherein the ends have no spline attachment and simply butted against each other. There was no bonding strength when no THF was present since there is nothing holding the edges of each plank together. When THF was applied to the edges after 4 hours cure, the bonding strength was over 100 pounds using a 100 pound scale, and after a 24 hour cure, the bonding strength was over 100 pounds using a 100 pound scale. When the test was repeated with a 152 mil spline with THF, using the INSTRON test, after 24 hour cure, the bonding strength was an average of 45.37 pounds.

A rolling secretary test using 165 pounds was then used. In this test, a 20 by 30 inch panel was used wherein a half of the panel was THF bonded over 24 hours and the other half of the panel had only splines holding the panels together. This panel was then laid on a carpet which caused movement up and down on the panel. The product with the 156 mils spline separated after 20 cycles and the other half of the product, which was sealed with THF, did not separate after 150 cycles. This was impressive considering the panel was not glued down to any surface.

A second panel was then made and placed on a sterling board with felt shim (0.26 inch) and placed in different places on the PVC board. This was done to cause unevenness in the subfloor. Upon doing the rolling secretary test again, the planks did not separate with the THF present.

Both products were then tested by placing them on towels and water was placed on the end cuts and the spline area. After 10 minutes, the water was wiped and the THF end cut area had very little penetration of water wherein the non-sealed area did show signs of leakage.

In the 75 pound slider test which was developed as a spline strength test, a 12 inch long spline was inserted into the tongue of a 12 inch plank and then a second plank was connected to the other side of the spline in order to connect two planks together. A hole was then drilled in the middle of one of the planks. With the two planks connected together, 75 pounds was placed on the plank without the hole and a 50 pound fish scale was hooked to the plank with the drilled hole and slowly pulled until the connected planks separated. With a 150 mil thick spline and a vertical gap thickness of PVC plank of approximately 154 mil on average, the product pulled apart from the spline after a static friction reading of about 25 pounds initial pull wherein the pull was done on a Lauan substrate. Using a spline that was 156 mil thick, the spline went in with some tapping and the test was done both on a Lauan and Sterling board substrate which gave different readings on the fish scale. With respect to the Sterling board substrate (static friction) of 40 pounds and (dynamic friction) of 35 pounds, the product did not pull apart. With respect to the Lauan (static friction) of 25 pounds and (dynamic friction) of 20 pounds, the product did not pull apart. A 159 mil spline was then used which was hard to install due to the thickness of the receiving tongue, in this test, Sterling (static friction) of 35 pounds and (dynamic friction) pulled apart but took some effort and the products did not move at all. With respect to the Lauan (static friction) of 35 pounds and (dynamic friction) of 30 pounds, the product slid but no separation.

In view of the above testing, these examples show that the addition of THF as a bonding agent provides significant strength advantages to the overall surface covering systems and also prevents water penetration to the subfloor especially at the edges where there is no spline system used.

Other embodiments of the present invention will be apparent to those skilled in the art from consideration of the specification and practice of the present invention disclosed herein. It is intended that the specification and examples be considered as exemplary only, with the true scope and spirit of the present invention being indicated by the following claims.

The invention claimed is:

1. A thermoplastic plank comprising:
   a core comprising at least one thermoplastic material wherein said core has a top surface, a bottom surface, and opposing sides;
   a digital printed design on said top surface of the plank;
   at least one protective coating on top of said digital printed design,
   wherein said thermoplastic material comprises at least one thermoplastic resin, at least one processing aid, at least one impact modifier, at least one lubricant, at least one stabilizer, and at least one plasticizer, wherein said plasticizer is present in an amount of less than about 20% by weight of said core;
   said core has a thickness of from about 5 mm to about 20 mm and a width of from about 2 cm to about 30 cm;
   said core has a series of paralleled cavities which are separated by said thermoplastic material;
   said core has at least one groove located on a side of said core; and
   wherein said core has a surface tension of at least 34 dynes/cm.

2. The plank of claim 1, wherein said core is a rigid thermoplastic material.

3. The plank of claim 1, wherein said at least one thermoplastic material is polyvinyl chloride.

4. The plank of claim 1, wherein said at least one thermoplastic material is a rigid polyvinyl chloride.

5. The plank of claim 1, wherein said core has a length of from about 30 cm to about 130 cm.

6. The plank of claim 1, wherein said series of cavities are rounded, triangular, or rectangular in cross-section.

7. The plank of claim 1, wherein each of said series of cavities includes a dimension of about 0.3 inch by about 0.3 inch and is separated by said thermoplastic material having a thickness of from about 0.05 inch to about 0.07 inch.

8. The plank of claim 1, wherein said core has a groove located on two sides of said core, wherein said sides are opposite to each other.

9. The plank of claim 1, wherein said grooves have teeth located on the upper surface, lower surface, or both upper and lower surfaces of said grooves.

10. The plank of claim 1, wherein two sides of said core are tapered or have beveled edges, wherein said sides are opposite to each other.

11. The plank of claim 1, wherein said bottom surface of said core has at least two bottom feet or a series of coextruded polymeric strips to raise said core from a subfloor or substrate surface.

12. The thermoplastic plank of claim 1, wherein said protective coating comprises a polyurethane type coating with or without wear resistant particles in the coating.

13. The thermoplastic plank of claim 1, wherein said thermoplastic material comprises polyvinyl chloride type polymers.

14. The thermoplastic laminate of claim 1, wherein said thermoplastic material further comprises at least one pigment.

15. The thermoplastic plank of claim 1, said plank having a substantially planar top surface, opposing sides, opposing ends, and a bottom surface, wherein said bottom surface has a plurality of channels formed therein, each of said channels extending longitudinally from one end of the plank to the other end of the plank.

16. The thermoplastic flooring plank of claim 15, wherein said channels are substantially U-shaped.

17. A flooring system comprising a plurality of the thermoplastic flooring planks of claim 15 connected together.

18. The thermoplastic plank of claim 1, said plank having substantially planar top and bottom surfaces, opposing ends, and a series of elongate cavities between said top and bottom surfaces, each of said cavities extending from one of said opposing ends of said plank to another of said opposing ends of said plank.

19. A flooring system comprising a plurality of the thermoplastic flooring planks of claim 18 connected together.

20. A surface covering comprising a plurality of thermoplastic planks of claim 1 joined together.

21. The surface covering of claim 20, wherein said surface covering is a floor covering that is a floating floor installation.

22. A floor covering comprising a plurality of thermoplastic planks, wherein said floor covering is a floating surface and wherein said thermoplastic plank comprises:
   a core comprising at least one thermoplastic material, wherein each core has a top surface and a bottom surface, and opposing sides;
   a digital printed design on said top surface of said core, wherein said digital printed design has a top surface and a bottom surface;
   a protective layer affixed to said top surface of said digital printed design,
   wherein said thermoplastic material comprises at least one thermoplastic resin, at least one processing aid, at least one impact modifier, at least one lubricant, at least one stabilizer, and at least one plasticizer, wherein said plasticizer is present in an amount of less than about 20% by weight of said core;
   said core has a thickness of from about 5 mm to about 20 mm and a width of from about 2 cm to about 30 cm;
   said core has a series of paralleled cavities which are separated by said thermoplastic material;
   said core has at least one groove located on a side of said core; and
   wherein said core has a surface tension of at least 34 dynes/cm.

23. The floor covering of claim 22, wherein at least a portion of said thermoplastic laminate planks are joined together by splines.

24. The floor covering of claim 22, wherein at least a portion of said thermoplastic laminate planks are joined together by a bonding agent.

25. The floor covering of claim 24, wherein said bonding agent is tetrahydrofuran methylene chloride, a ketone, or combinations thereof.

26. A thermoplastic plank comprising:
a core comprising at least one thermoplastic material, wherein said core has a top surface and a bottom surface, and opposing sides;
a digital printed design on said top surface of said core, wherein said digital printed design has a top surface and a bottom surface;
at least one protective layer affixed to said top surface of said digital printed design, with the proviso that no backing layer is located adjacent the bottom surface of said core,
wherein said thermoplastic material comprises at least one thermoplastic resin, at least one processing aid, at least one impact modifier, at least one lubricant, at least one stabilizer, and at least one plasticizer, wherein said plasticizer is present in an amount of less than about 20% by weight of said core;
said core has a thickness of from about 5 mm to about 20 mm and a width of from about 2 cm to about 30 cm;
said core has a series of paralleled cavities which are separated by said thermoplastic material;
said core has at least one groove located on a side of said core; and
wherein said core has a surface tension of at least 34 dynes/cm.

27. The thermoplastic plank of claim 26, wherein each core has a series of parallel cavities which are separated by said thermoplastic material, wherein the thickness of the thermoplastic material separating the outermost cavities is thicker than the thickness of the thermoplastic material separating the innermost cavities.

28. A thermoplastic plank comprising:
a core comprising at least one thermoplastic material, wherein said core has a top surface and a bottom surface, and opposing sides;
a digital printed design on said top surface of said core, wherein said digital printed design has a top surface and a bottom surface;
a protective layer affixed to said top surface of said digital printed design, wherein said at least bottom surface of the core is thermally treated,
wherein said thermoplastic material comprises at least one thermoplastic resin, at least one processing aid, at least one impact modifier, at least one lubricant, at least one stabilizer, and at least one plasticizer, wherein said plasticizer is present in an amount of less than about 20% by weight of said core;
said core has a thickness of from about 5 mm to about 20 mm and a width of from about 2 cm to about 30 cm;
said core has a series of paralleled cavities which are separated by said thermoplastic material;
said core has at least one groove located on a side of said core; and
wherein said core has a surface tension of at least 34 dynes/cm.

29. The thermoplastic plank of claim 1, wherein no filler is present in said core.

30. The thermoplastic plank of claim 1, wherein said core has a surface tension of at least 45 dynes/cm.

31. The thermoplastic plank of claim 1, wherein said core has a surface tension of 34 dynes/cm to 45 dynes/cm.

32. The thermoplastic plank of claim 26, wherein said core has a surface tension of at least 45 dynes/cm.

33. The thermoplastic plank of claim 26, wherein said core has a surface tension of 34 dynes/cm to 45 dynes/cm.

34. The thermoplastic plank of claim 28, wherein said core has a surface tension of at least 45 dynes/cm.

35. The thermoplastic plank of claim 28, wherein said core has a surface tension of 34 dynes/cm to 45 dynes/cm.

* * * * *